United States Patent
Stäbler et al.

(10) Patent No.: US 12,017,584 B2
(45) Date of Patent: Jun. 25, 2024

(54) METHOD, COMPUTER PROGRAM AND APPARATUS FOR PLAYBACK OF MESSAGES IN A VEHICLE

(71) Applicant: VOLKSWAGEN AKTIENGESELLSCHAFT, Wolfsburg (DE)

(72) Inventors: Mathias Stäbler, Berlin (DE); Daniela Schlott, Berlin (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 56 days.

(21) Appl. No.: 17/997,623

(22) PCT Filed: Apr. 12, 2021

(86) PCT No.: PCT/EP2021/059453
§ 371 (c)(1),
(2) Date: Oct. 31, 2022

(87) PCT Pub. No.: WO2021/223963
PCT Pub. Date: Nov. 11, 2021

(65) Prior Publication Data
US 2023/0166658 A1    Jun. 1, 2023

(30) Foreign Application Priority Data

May 5, 2020   (DE) .................... 10 2020 205 674.9

(51) Int. Cl.
*B60Q 9/00*     (2006.01)
*B60K 35/00*    (2024.01)
*B60K 35/29*    (2024.01)

(52) U.S. Cl.
CPC ................ *B60Q 9/00* (2013.01); *B60K 35/00* (2013.01); *B60K 35/29* (2024.01); *B60K 2360/186* (2024.01)

(58) Field of Classification Search
CPC .......... B60Q 9/00; B60K 35/00; B60K 35/29; B60K 2360/186; B60K 2360/195; B60K 35/28; B60K 35/22
See application file for complete search history.

(56) References Cited

U.S. PATENT DOCUMENTS 6,389,332 B1    5/2002  Hess et al.
10,211,122 B2   2/2019  Kato et al.
(Continued)

FOREIGN PATENT DOCUMENTS

DE         19919216 A1   11/2000
DE      102013000273 A1    7/2014
(Continued)

OTHER PUBLICATIONS

Search Report; International Patent Application No. PCT/EP2021/059453; Jul. 19, 2021.

*Primary Examiner* — Omeed Alizada
(74) *Attorney, Agent, or Firm* — Barnes & Thornburg LLP

(57) ABSTRACT

A method for playback of messages in a transportation vehicle, wherein messages are received by components of the transportation vehicle. In response to messages being present at the same time, these messages are prioritized relative to each other based on a category allocated in each case. The prioritized messages are played back according to the respective priorities thereof.

17 Claims, 3 Drawing Sheets

(56) References Cited

U.S. PATENT DOCUMENTS

| | | | |
|---|---|---|---|
| 11,267,402 B1* | 3/2022 | Hawley | B60K 35/22 |
| 2009/0187343 A1 | 7/2009 | Koch-Groeber et al. | |
| 2010/0262469 A1 | 10/2010 | Fein et al. | |
| 2015/0266377 A1* | 9/2015 | Hampiholi | B60K 35/00 |
| | | | 455/466 |
| 2016/0266767 A1 | 9/2016 | Mizuguchi et al. | |
| 2018/0281788 A1 | 10/2018 | Uchida | |
| 2018/0336423 A1 | 11/2018 | Ban et al. | |
| 2019/0337533 A1 | 11/2019 | Kume et al. | |
| 2020/0122578 A1 | 4/2020 | Matsushita | |
| 2021/0213970 A1* | 7/2021 | Almeida | G10L 15/22 |

FOREIGN PATENT DOCUMENTS

| | | |
|---|---|---|
| DE | 112013007572 T5 | 8/2016 |
| DE | 112014007048 T5 | 8/2017 |
| DE | 112014007285 T5 | 10/2017 |
| EP | 1080976 A2 | 3/2001 |
| EP | 2787427 A1 | 10/2014 |
| EP | 3363673 A1 | 8/2018 |

* cited by examiner

METHOD, COMPUTER PROGRAM AND APPARATUS FOR PLAYBACK OF MESSAGES IN A VEHICLE

PRIORITY CLAIM

This patent application is a U.S. National Phase of International Patent Application No. PCT/EP2021/059453, filed 12 Apr. 2021, which claims priority to German Patent Application No. 10 2020 205 674.9, filed 5 May 2020, the disclosures of which are incorporated herein by reference in their entireties.

SUMMARY

Illustrative embodiments relate to a method for playback of messages in a transportation vehicle. Illustrative embodiments relate further to an apparatus for playback of messages in a transportation vehicle and to a computer program for carrying out the disclosed method.

BRIEF DESCRIPTION OF THE DRAWINGS

Disclosed embodiments will be described in more detail below with reference to the figures, in which.

DETAILED DESCRIPTION

Figure 1:
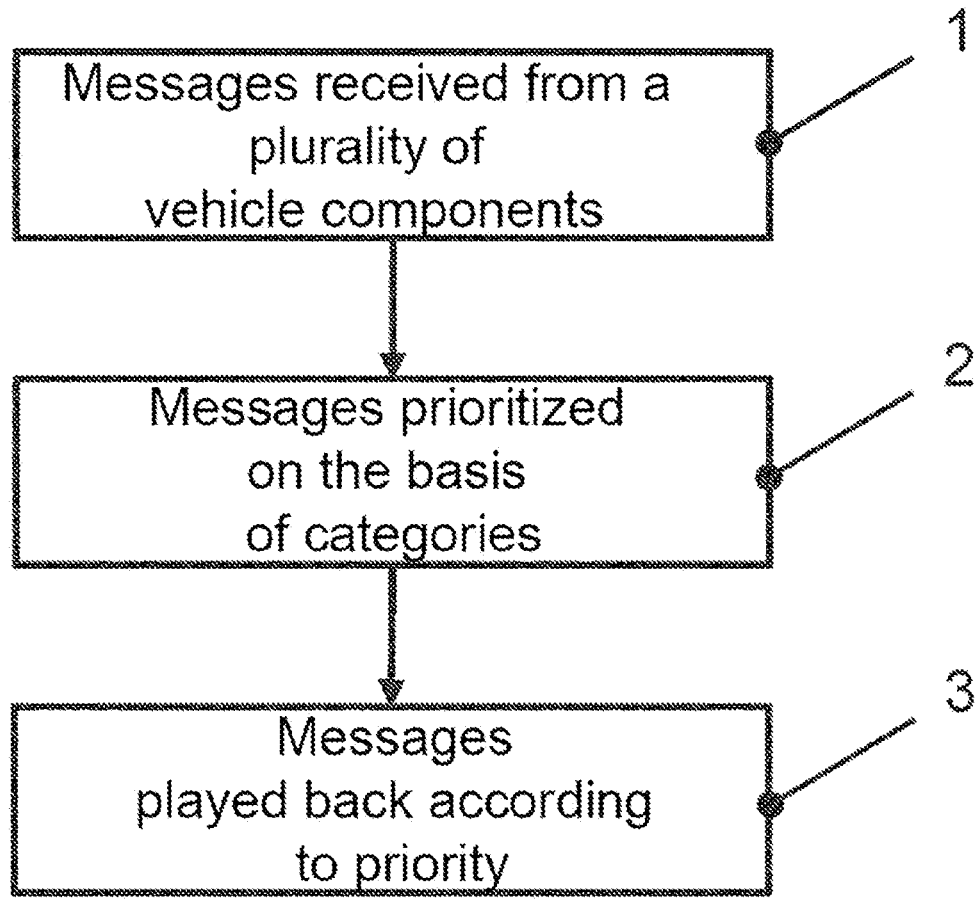
FIG. 1 schematically shows a flow diagram for an exemplary embodiment of the disclosed method.

In transportation vehicles, information of different kinds is outputted to the driver but also to other occupants of the transportation vehicle. Almost all current transportation vehicles thus have an instrument cluster above the steering column in which transportation vehicle parameters are displayed, for example, the speed or revolutions per minute, the current fill level of the fuel tank or battery, indicator and warning lamps, e.g., for the direction indicator, full beam, applied parking brake, unfastened seatbelts or malfunctions and defects of important transportation vehicle components and further information of an on-board computer. Environmental parameters, for example, the outside temperature, can also be displayed.

This or also other information can additionally also be displayed on a head-up display or on a display arranged in the center console. In particular, infotainment systems, in which car radio, media playback, navigation system, telephone, software applications (so-called apps) and optionally further functions are combined in a central control unit, frequently use a display arranged in the center console.

In addition to the displays and indicator lamps, output possibilities for acoustic signals, for example, for warning sounds or voice outputs, are frequently also provided. Furthermore, haptic feedback can also be outputted, for example, by piezo systems integrated in control elements.

Various messages can thereby also be displayed on a display or played back by voice output. Thus, US 2018/0336423 A1 describes detecting an object in the surroundings of the transportation vehicle by a vehicle camera and outputting a message in relation thereto, for example, by display on a head-up display or by voice output. On the basis of machine learning processes, different messages are thereby outputted according to the type of event, such as an insufficient safety distance, a winding road, the blocking of a traffic lane by a transportation vehicle which has been involved in an accident, or the jumping of a traffic light, and the respective hazard rating. If the driver does not react within a defined period of time, a transportation vehicle function can be initiated automatically. Similar methods are also disclosed in US 2009/0187343 A1 and US 2018/0281788 A1.

Disclosed embodiments provide a method, a computer program and an apparatus for improved playback of messages in a transportation vehicle.

This is achieved by the disclosed method, by the disclosed computer program, and by the disclosed apparatus.

The disclosed embodiments are based on the finding that, in a transportation vehicle, messages for the driver are generated by a large number of different functions which are implemented as separate hardware or software components. Thus, for example, information about a hazardous situation can be generated and outputted by a navigation application, information about a required servicing measure can be generated and outputted by a central control device, an incoming call can be indicated by a message from a telephone application, or a notification received by an email or messenger service or from a news portal can be displayed. These messages are generated independently of one another. It can thereby happen that messages of different kinds are generated almost simultaneously and are to be brought to the attention of the driver.

In the exemplary method for playback of messages in a transportation vehicle, messages are received from a plurality of components of the transportation vehicle. In the case where a plurality of messages are present simultaneously, these messages are prioritized relative to one another on the basis of a respective allocated category. The prioritized messages are played back according to their respective priority.

This allows the playback for messages generated by different components of the transportation vehicle to be controlled centrally so that display conflicts or an information overload as a result of the simultaneous display of too much information are avoided. In this manner, in particular, a hazard due to distraction from the task of driving or due to a safety-related message being overlooked is prevented.

Messages with the highest priority are thereby played back immediately, and messages with a lower priority are temporarily stored and are played back at a later time.

According to at least one disclosed embodiment, in the case where a plurality of messages of the same category are present simultaneously, the most recent notification may be played back first.

According to a further disclosed embodiment, messages of a category are each allocated one of a plurality of possible values within a value range, wherein, in the case where a plurality of messages of the same category are present simultaneously, the message with a maximum or minimum value is prioritized and played back first.

A plurality of playback channels are provided for playback of the messages, wherein the plurality of playback channels include one or more visual channels by one or more displays and/or LED light chains, one or more acoustic channels by one or more loudspeakers, and/or one or more haptic channels by one or more actuators.

Furthermore, a message with a high priority can be outputted on a plurality of playback channels simultaneously.

Likewise, it can be provided that a plurality of different messages are outputted simultaneously on a plurality of different playback channels.

A message of a category may be displayed for a minimum display time before it is replaced by a display of another message.

Likewise, a message of a category displayed on a display is overlaid or displaced by a display of a message of a higher category.

According to at least one disclosed embodiment, the messages are sent by the plurality of components of the transportation vehicle to a central control device or a central software component of the transportation vehicle, wherein the central control device or the central software component prioritizes the received messages.

A disclosed computer program contains instructions which, when carried out by a computer, cause the computer to receive messages from a plurality of components of the transportation vehicle, in the case where a plurality of messages are present simultaneously to prioritize those messages relative to one another on the basis of a respective allocated category, and to play back the prioritized messages according to their respective priority.

The term computer is to be interpreted broadly. In particular, it also includes control devices, microcontrollers, embedded systems and other processor-based data processing devices. The computer program can be provided for electronic retrieval, for example, or can be stored on a computer-readable memory medium.

An exemplary apparatus for playback of messages in a transportation vehicle comprises
an input for receiving messages from a plurality of components of the transportation vehicle;
a prioritization unit to which the received messages are fed and which, in the case where a plurality of messages are present simultaneously, prioritizes those messages relative to one another on the basis of a respective allocated category; and
an output for providing the prioritized messages for playback according to their respective priority.

For better understanding of the principles of the present disclosure, exemplary embodiments are explained in greater detail below with reference to the figures. It will be appreciated that the disclosure is not limited to these disclosed embodiments and that the described features can also be combined or modified without departing from the scope of protection of the disclosure as defined in the claims.

FIG. 1 shows, schematically, an exemplary embodiment of the disclosed method for playback of messages in a transportation vehicle. According to method operation 1, messages are received from a plurality of components of the transportation vehicle. Messages are here understood as being any notifications which are sent to the driver or to other occupants of the transportation vehicle. They can be, for example, warnings about an acute or impending hazardous situation or can relate to technical problems of the transportation vehicle, the current transportation vehicle surroundings or the traffic situation on the future route of the transportation vehicle. Likewise, information about required servicing measures, a change to the proposed driving route or suggestions relating to the driver's manner of driving can also be outputted. Information relating to a communication with persons outside the transportation vehicle can also be given. Likewise, information about current settings, for example, of the vehicle air conditioning system, is possible. These messages are generated by different software and/or hardware components of the transportation vehicle and are received and processed by a further, central software or hardware component of the transportation vehicle. The central vehicle component must be available for this purpose even before messages can be initiated by one of the other vehicle components.

The messages are categorized by being allocated to one of a plurality of categories. Categorization of the messages can take place in the respective vehicle components, which allocate a category to each of the messages they generate and then send the category with the message. However, categorization can likewise take place in the central vehicle component, which, on receiving the messages, then allocates a category thereto. However, regardless of where categorization takes place, it is important that every message is categorized and that the central vehicle component knows and is able to process all the possible categories.

Use is thereby made of categories for different types of message which have been established by a messaging body. Thus, categories can be defined in open or proprietary standards and regulations for different types of messages, for example, on the basis of legal requirements, FuSi classifications within the context of standard ISO 26262:2011, an internationally applicable standard in the automotive sector for electric and electronic systems of road vehicles, or also on the basis of other content-related distinctions.

This makes it possible in a method operation 2 to control playback in the case where a plurality of messages occur simultaneously by prioritizing the messages on the basis of their respective category.

An example of the categorization of messages in categories A to K, which can be used for prioritization, is as follows:
category A immediately imminent hazardous situation with immediate call for action or driver intervention with intervention time<2 s
category B severe transportation vehicle constraint with a time-critical call for action which allows an intervention time>2 s
category C non-immediately imminent hazardous situation which occurs in the vicinity or on the planned route
category D system constraint which requires servicing measures to be taken
category E communication with the driver initiated by persons outside the transportation vehicle
category F adjustment of the driving mode or of the route is necessary
category G currently existing system constraint which reduces only convenience but not safety while driving and does not automatically cure itself
category H currently existing system constraint which reduces only convenience but not safety while driving and automatically cures itself
category I system will in future experience a constraint, or the system could be improved
category J predictive notifications by applications, without direct user input, which make the task of driving more convenient
category K general status notifications, success notifications and feedback from applications without direct user input However, there can likewise also be provided a grading of the categories that is based on different criteria or also a coarser or finer grading of the categories.

The prioritized messages are then played back in method operation 3 on the basis of their respective priority, so that playback conflicts or an information overload as a result of the simultaneous playback of too much information are avoided.

Playback of the messages in the transportation vehicle to the driver or other occupants, and optionally also an interaction, can in principle take place by human-machine interfaces (HMI) of different kinds. Particularly suitable playback channels are visual channels by one or more displays, because these permit a large number of different modalities, for example, the display of messages as a popup, in combination with symbols or as an animation. Safety-critical messages may be played back as popups which, by popping up, immediately attract attention and emphasize urgency. If a message is already displayed on the display, it can thereby be overlaid, displaced or replaced by a message of a higher priority.

However, messages can likewise be outputted through acoustic channels, in particular, by voice output via one or more loudspeakers. As supporting measures, warning sounds can also be outputted, display can be effected by LED light chains or haptic feedback can be provided. Furthermore, coloring of a transportation vehicle window or of a so-called display control panel, in which there are display and control elements for the display, can also be provided.

A touchscreen display can further be provided for playback, so that, by touching a graphical user interface at the location of a displayed message, a function which may be associated therewith can be carried out. Likewise, more detailed information relating to the message, such as detailed text information, images and video clips, can be retrieved and outputted in this manner. Display on a central touchscreen display permits particularly convenient operation by the user in the region of the center console. However, such interaction can likewise take place, for example, in the case of a display on the instrument cluster or on a head-up display of the transportation vehicle, by a voice input or mechanical control buttons or knobs which are associated with what is displayed on the display.

The playback channels for outputting the messages can be allocated by the central vehicle component. The central vehicle component thereby contains information about all the playback channels that are in principle possible for the playback of messages. The central vehicle component likewise knows the status of the respective playback channels, that is to say whether the components required therefor are installed in the transportation vehicle at all and are active or optionally defective. For displays, it is additionally noted whether these are within the field of vision of the driver, to ensure that messages which are sent to the driver can also be seen by the driver.

Priorities can likewise be allocated to the various components for playback. Thus, for example, displays in the line of sight can have priority 1, a light strip or audio playback channels can have priority 2, and other components in which there is a display can have priority 3. The central vehicle component can then decide which of the components should be used for playback on the basis of the category of a message.

The central vehicle component further manages the messages on all the playback channels, optionally also on a plurality of playback channels simultaneously, for example, to synchronize the display of the messages on the playback channels or to permit the displacement of a message from one playback channel to another playback channel or the reactivation of a message at a later time.

In particular, when messages with the highest priority are present, these are played back without delay. Because such messages can reflect an immediate hazardous situation, a parallel output via a plurality of playback channels can be carried out, for example, as a flashing display on a display in combination with a voice output of the message and vibration of the steering wheel. If messages with a lower priority are present at the same time and if these messages are displaced from playback by the messages with higher priority, then the displaced messages are temporarily stored and played back at a later time. However, a plurality of messages with different categories can likewise be displayed simultaneously on different playback channels.

In the case where a plurality of messages of the same category are present simultaneously, the most recent message can be played back first. This message is then displayed for a minimum display time before it is replaced by a display of a message of the same category.

This minimum display time also applies where a plurality of messages of different categories or priorities are present simultaneously. Depending on the implementation of the HMI and the legal conditions, this can lead to a message then in some circumstances being displayed on a different display than allocated according to the category or priority. This occurs if a message must continue to be displayed on the originally allocated display because the minimum display time of the displayed message has not yet elapsed.

However, it can likewise also be provided to provide a grading within a category by allocating to a message one of a plurality of possible values within a value range. In the case of two incoming messages of the same category, one of the messages is then prioritized on the basis of the allocated value and played back first. Such a grading within a category can likewise be established by a messaging body already mentioned above.

Figure 2:
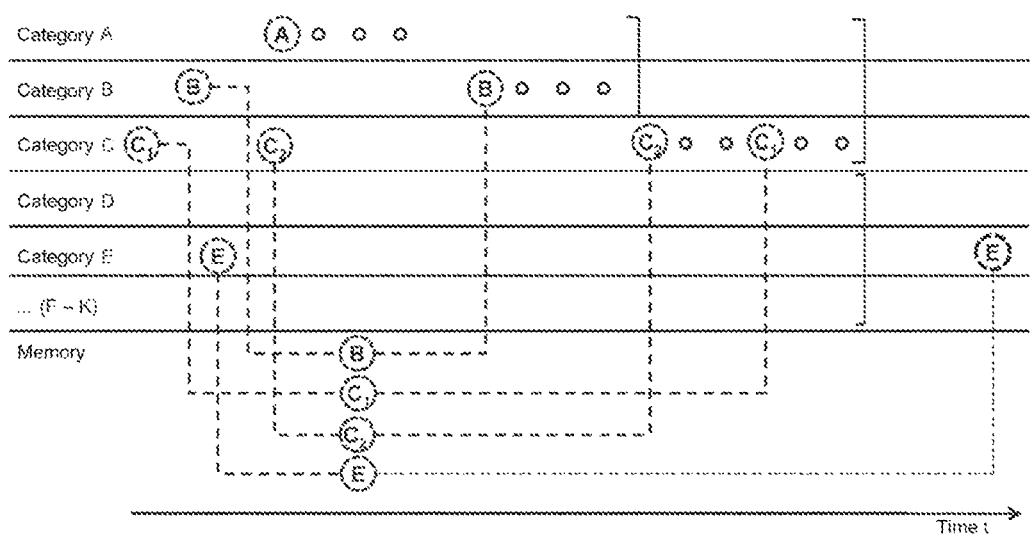
FIG. 2 shows an example of a time profile of a category-based displacement and activation of messages.

FIG. 2 shows an example of a time profile of a category-based displacement and activation of messages. Categories A to K correspond to the categories indicated by way of example above, but for the sake of clarity only messages of categories A to E are used in the example shown. Messages of the highest categories A to C represent immediate or non-immediate hazard notifications or severe vehicle constraints and are therefore displayed immediately. If messages of a category with lower priority are displaced by a message with a category of higher priority, these messages are temporarily stored and, provided that they are then still relevant, are played back at a later time after a delay.

The messages are thereby sorted in the memory according to their priority and are correspondingly played back. Messages with categories of lower priority, for example, news from a news portal, are subsequently deleted from the memory. On the other hand, safety-critical and vehicle-relevant messages can also be stored permanently, with the possibility for the user or also third parties to be able to retrieve them again.

In the example shown, the message which arrives first belongs to category C. This message is displayed immediately. Shortly thereafter, a message of category B arrives. Because this has a higher priority than the previous message, the message of category B is now displayed and the message of category C is stored in the memory and not displayed further. The communication of category E which then arrives is directly stored in the memory and, according to its lower priority, graded below the message of category C. Playback of the message of category B is then interrupted by the arrival of a message of category A, which is displayed immediately because of its highest priority. The message of category B, because its minimum display time has not yet elapsed, is then likewise stored in the memory, as is the further message of category C which arrived at the same time as the message of category A. The message of category A is then displayed until its minimum display time has elapsed or the immediate hazard is no longer present. Thereafter, the message of category B is retrieved from the memory and then likewise played back until the minimum display time has elapsed. The two messages of category C are then played back, wherein the more recent notification is displayed first. After the minimum display time for each of these messages has likewise elapsed, the message of category E, which has not yet been displayed, is finally called up from the memory and played back.

In the example shown, the temporarily stored messages are each still relevant or current and are therefore activated again for playback. Whether a message is still current is managed by the component which generated that message. The central vehicle component then queries this status before activation.

Figure 3:
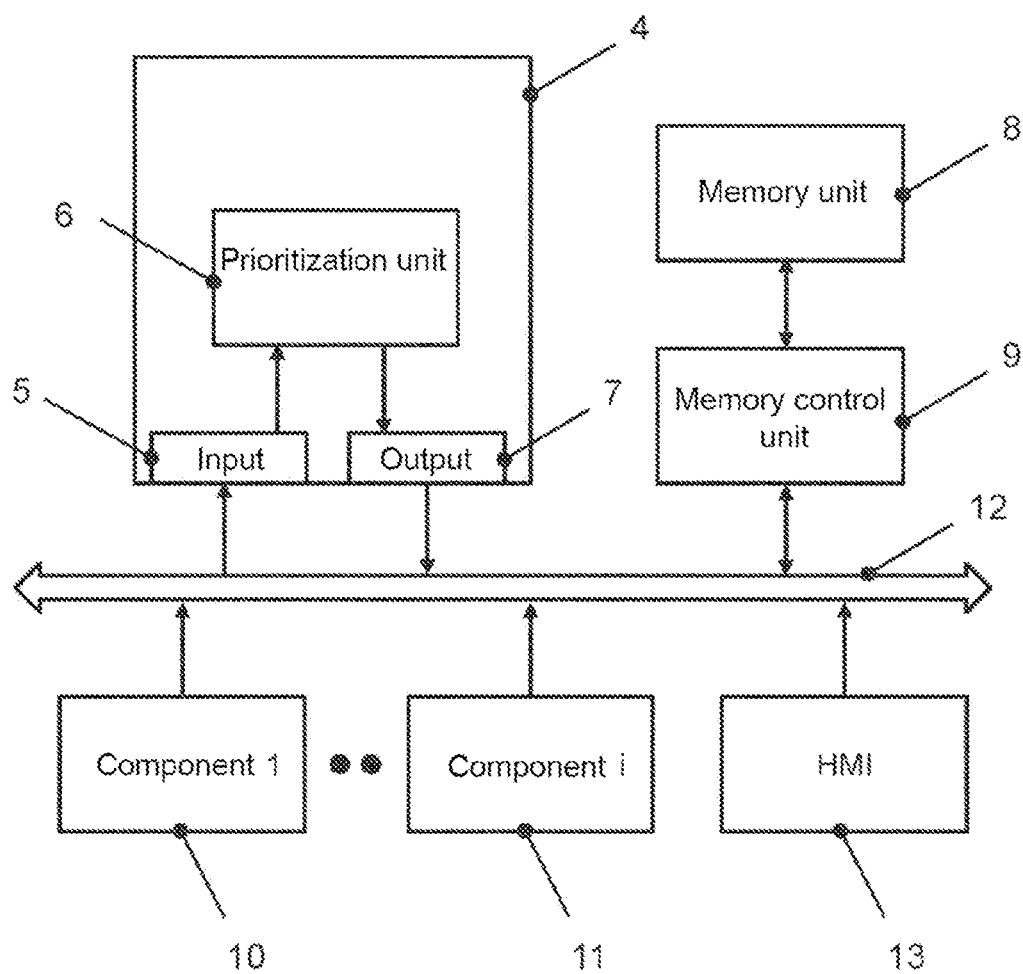
FIG. 3 schematically shows a block diagram of an exemplary apparatus in conjunction with further components of a transportation vehicle.

FIG. 3 shows, schematically, a simplified block diagram of an exemplary apparatus 4 in conjunction with further components of a transportation vehicle. For example, the apparatus 4 is a control device, a computer, a microcontroller or an embedded system and is provided with a processor and a memory, in which instructions are stored which, when carried out by the processor, cause the apparatus 4 to carry out the operations according to one of the methods described above.

The apparatus 4 has an input 5 for receiving the messages, which are sent to the apparatus by different vehicle components 10, 11 via a vehicle bus 12. The received messages are fed to a prioritization unit 6, in which the messages are prioritized on the basis of a respective allocated category and are then provided via an output 7 for playback according to their respective priority. The input 5 and the output 7 can be combined to form a bidirectional interface.

Messages can be temporarily stored in a memory unit 8. The memory unit 8 can consist of a memory element or of a plurality of separate memory elements for messages of different categories or priorities. The memory elements can be in the form of, for example, random access memory (RAM), dynamic random access memory (DRAM), EPROM or flash memory, wherein it is optionally ensured by a constant power supply that safety-critical or vehicle-relevant messages are not lost. Messages which require a service intervention or which are permanently relevant can thus also be retained in the memory unit until the user has actively "read" them, and they can then be deleted or also, marked as "read", be retained further.

There is further provided a memory control unit 9 which controls the flow of data between the prioritization unit 6 and the memory unit 8 and sorts the messages in the memory according to their priority. The memory control unit can further ensure that messages with categories of lower priority are deleted from the memory after they have been played back.

Finally, a user interface (HMI) 13 is provided, by which the above-described information output to the user of the transportation vehicle and optionally interaction with the user takes place.

The disclosed embodiments can be used in many different types of transportation vehicles, such as passenger cars, motorbikes, trucks, motor caravans or buses, but is not limited to use in such transportation vehicles.

LIST OF REFERENCE NUMERALS 1-3 Method operations
4 Exemplary apparatus
5 Input
6 Prioritization unit
7 Output
8 Memory unit
9 Memory control unit
10, 11 Vehicle components
12 Vehicle bus
13 User interface

The invention claimed is:

1. A method for output of messages to a user in a transportation vehicle under control of a central vehicle component, the method comprising:
receiving messages at the central vehicle component from a plurality of on-vehicle components of the transportation vehicle, wherein the messages are categorized by being allocated to one of a plurality of categories, wherein the plurality of categories includes a category of messages generated off-vehicle and transmitted to the transportation vehicle and also includes a plurality of categories of messages that include functional safety information pertaining to operation of the vehicle;
in response to a plurality of messages being present simultaneously, the central vehicle component prioritizing the simultaneously present messages relative to one another based on their respective allocated categories; and
outputting the prioritized messages under control of the central vehicle component to a user of the transportation vehicle in an order and via at least one of a plurality of output channels according to their respective allocated priorities,
wherein a message with high priority is output on at least two of the plurality of output channels simultaneously based on the category of the message,
wherein a plurality of different messages having differing priorities are output simultaneously on the plurality of output channels,
wherein at least one category of messages of the plurality of categories of messages that included functional safety information pertaining to operation of the vehicle is prioritized higher than the category of messages generated off-vehicle and transmitted to the transportation vehicle; and
wherein the messages are categorized by the on-vehicle components sending the messages such that the messages are allocated to one of the plurality of categories by the on-vehicle components, and wherein the allocated message categories are sent with the messages to the central vehicle component by the plurality of on-vehicle components.

2. The method of claim 1, wherein messages with the highest priority are output immediately and messages with a lower priority are temporarily stored and are output at a later time.

3. The method of claim 1, wherein, in response to a plurality of messages of the same category being present simultaneously, the most recent notification is output first.

4. The method of claim 3, further comprising allocating messages of a particular category one of a plurality of possible values within a value range and, in response to a plurality of messages of the same category being present simultaneously, the message with a maximum or minimum value is prioritized and output first.

5. The method of claim 1, wherein the plurality of output channels include one or more visual channels by one or more displays and/or LED light chains, one or more acoustic channels by one or more loudspeakers, and/or one or more haptic channels by one or more actuators.

6. The method of claim 1, wherein a message of a category is output for a minimum display time before it is replaced by output of another message of the same category.

7. The method of claim 1, wherein one of the plurality of output channels is a display and wherein a message of a category displayed on a display is overlaid or displaced by a display of a message of a higher category.

8. The method of claim 1, wherein the messages are sent by the plurality of components of the transportation vehicle to a central control device or a central software component of the transportation vehicle, and the central control device or the central software component prioritizes the received messages based on the received messages' allocated category.

9. A non-transitory computer readable including a computer program having instructions which, when carried out by a computer, cause the computer to carry out the method of claim 1.

10. An apparatus for output of messages to a user in a transportation vehicle including a central vehicle component, the central vehicle component comprising:
 an input for receiving messages from a plurality of on-vehicle components of the transportation vehicle, wherein the messages are categorized by being allocated to one of a plurality of categories, wherein the plurality of categories includes a category of messages generated off-vehicle and transmitted to the transportation vehicle and also includes a plurality of categories of messages that include functional safety information pertaining to operation of the vehicle;
 a prioritization unit to which the received messages are fed and which, in response to a plurality of received messages being present simultaneously, prioritizes the received messages relative to one another based on their respective allocated categories; and
 an output for outputting the prioritized messages to a user of the transportation vehicle in an order and via at least one of a plurality of output channels according to their respective allocated priorities,
 wherein a message with high priority is output on at least two of the plurality of output channels simultaneously based on the category of the message, and
 wherein a plurality of different messages having differing priorities are output simultaneously on the plurality of output channels, and
 wherein at least one category of the plurality of categories of messages that included functional safety information pertaining to operation of the vehicle is prioritized higher than the category of messages generated off-vehicle and transmitted to the transportation vehicle; and
 wherein the messages are categorized by the on-vehicle components sending the messages such that the messages are allocated to one of the plurality of categories by the on-vehicle components, and wherein the allocated message categories are sent with the messages to the central vehicle component by the plurality of on-vehicle components.

11. The apparatus of claim 10, wherein messages with the highest priority are output immediately and messages with a lower priority are temporarily stored and are output at a later time.

12. The apparatus of claim 10, wherein, in response to a plurality of messages of the same category being present simultaneously, the most recent notification is output first.

13. The apparatus of claim 12, wherein messages of a category are each allocated one of a plurality of possible values within a value range and, in response to a plurality of messages of the same category being present simultaneously, the message with a maximum or minimum value is prioritized and output first.

14. The apparatus of claim 1, wherein the plurality of output channels include one or more visual channels by one or more displays and/or LED light chains, one or more acoustic channels by one or more loudspeakers, and/or one or more haptic channels by one or more actuators.

15. The apparatus of claim 10, wherein a message of a category is output for a minimum display time before it is replaced by output of another message of the same category.

16. The apparatus of claim 10, wherein the plurality of output channels includes a display and wherein a message of a category displayed on the display is overlaid or displaced by a display of a message of a higher category.

17. The apparatus of claim 10, wherein the messages are sent by the plurality of components of the transportation vehicle to a central control device or a central software component of the transportation vehicle, and the central control device or the central software component prioritizes the received messages based on the received messages' allocated category.

* * * * *